United States Patent [19]

Ford

[11] Patent Number: 5,168,504
[45] Date of Patent: Dec. 1, 1992

[54] BE COATED GLASS CATHODE WITH HIGH CONCENTRATION OF BEO

[75] Inventor: Carol M. Ford, Columbia Heights, Minn.

[73] Assignee: Honeywell Inc., Minneapolis, Minn.

[21] Appl. No.: 818,186

[22] Filed: Jan. 8, 1992

Related U.S. Application Data

[63] Continuation-in-part of Ser. No. 650,190, Feb. 4, 1991, abandoned.

[51] Int. Cl.⁵ .............................................. H01S 3/097
[52] U.S. Cl. ....................................... 372/87; 372/94; 313/633; 313/575
[58] Field of Search ................ 372/94, 87; 313/631, 313/633, 634, 635; 315/574, 575

[56] References Cited

U.S. PATENT DOCUMENTS

| | | | |
|---|---|---|---|
| 4,853,940 | 8/1989 | Ford et al. | 372/87 |
| 4,910,748 | 3/1990 | Ford et al. | 372/87 |

Primary Examiner—Leon Scott, Jr.
Attorney, Agent, or Firm—Robert A. Pajak

[57] ABSTRACT

A cathode for a laser generator includes a monolithic substrate consisting essentially of a nonconductive material and including a thin film of a conductive material deposited thereon. The substrate has an inner and outer surface, the thin film substantially contiguously covers the substrate and prevents exposure of the substrate over the life of the cathode, and the conductive thin film is oversprayed onto a portion of the substrate's outer surface so as to allow electrical contact from the outer surface to the inner surface.

12 Claims, 2 Drawing Sheets

BE COATED GLASS CATHODE WITH HIGH CONCENTRATION OF BEO

RELATED APPLICATIONS

This application is a continuation-in-part of copending application Ser. No. 07/650,190, "INCREASED CATHODE LIFE DUE TO INCREASING SECONDARY ELECTRON EMISSIONS", Carol M. Ford, filed Feb. 4, 1991, assigned to the same assignee as the present invention.

BACKGROUND OF THE INVENTION

The present invention relates generally to gas discharge devices, and more particularly to the cathode construction found in such devices.

A laser typically employs an unheated or cold cathode which is secured to a laser body or housing as a source of electron emission for laser operation. The body of the laser may be composed of glass or glass like materials, generally having low coefficients of thermal expansion. The cathode may be composed of a metal or metal-alloy material well known in the art, for example aluminum. The cathode is generally secured to the laser body by a gas tight seal, and is adapted to be connected to a negative electrical potential source.

In gas lasers having a limited gas supply, cathode sputtering is one of the major causes of shortened laser life. In a heliumneon gas laser, positively charged gas ions of the plasma are attracted to the negatively charged cathode, and release negatively charged electrons. Unfortunately, the positively charge ions can dislodge cathode material molecules from the active electron emitting surface of the cathode. This phenomenon is usually referred to as cathode sputtering. For gas laser applications, cathode sputtering results in decreased laser life. As a result of cathode sputtering, the dislodged cathode material can, in turn, trap gas molecules to the walls of the cathode and the walls of the laser cavity. If the supply of gas needed for lasing is limited, the reduction of available gas ions can cause the laser action to cease.

Metallic cathodes, particularly aluminum cathodes, have been widely used in the art for gas lasers. An aluminum cathode generally has a cathode emitting surface coated with a thin layer of oxide to prevent cathode sputtering. During the cathode manufacturing process, a layer of oxide is formed naturally by exposing a cleaned aluminum cathode emitting surface to an oxygen plasma with the aluminum cathode connected as the cathode in an electrical circuit. A thin layer of oxide is formed on the aluminum electron emitting surface due to the pressure of oxygen and oxygen ions hitting the cathode surface.

Aluminum cathodes having the oxide layer have improved laser life above that of uncoated aluminum due to increased resistance to sputtering. This is so since the oxide layer is generally harder than the aluminum. Nevertheless, irregularities in the emitting surface of the cathode can result in localized ion flow which in time breaks down the oxide layer, and begins localized sputtering of the cathode resulting in extinction of the laser.

U.S. Pat. No. 4,672,623 to Mellum, et al. entitled "CATHODE CONSTRUCTION FOR A LASER" discloses a cathode for a ring laser comprising a housing composed of substantially a nickel-iron composition. The cathode in Mellum, et al. includes an inner cavity with a coating of low sputter electrically conductive material thereon.

Another example of a prior art cathode is disclosed in U.S. Pat. No. 4,853,940 to Ford, et al. which is entitled "LASER CATHODE COMPOSED OF IMBEDDED LASER GAS MOLECULES". U.S. Pat. No. 4,853,940 discloses a long life cathode for laser generators consisting of a cathode body having an electron emitting surface in which lasing gas molecules are embedded.

Yet another example of a laser cathode is disclosed in U.S. Pat. No. 4,910,748 to Ford, et al. which is entitled "LASER CATHODE COMPOSED OF OXIDIZED METALLIC PARTICLES". U.S. Pat. No. 4,910,748 discloses a cathode for laser generators consisting of a monolithic body of an agglomeration of oxidized metallic particles of beryllium or aluminum. The Ford, et al. '748 patent uses a beryllium powder available from Brush Wellman, Inc. which includes 98% beryllium, a maximum of 2% beryllium oxide and trace amounts of other elements.

As reported in an article entitled *The Secondary Electron Emission Characteristics of Oxidized Beryllium Cathodes* by Ritz, et al., US Naval Research Laboratory, Surface and Interface Analysis, Volume 11, 389-397 (1988), carbon has been found to significantly lower the secondary electron emission of beryllium. However, carbon can be reduced by several hundred atomic layers at the surface of the cathode by sputtering of the cathode by oxygen, argon, helium and/or neon. Ritz, et al. teaches a method for reducing a carbon layer on such cathodes, but does not recognize the importance of increasing the BEO content in the cathode as is recognized by the instant invention. The Ritz, et al. article is incorporated herein by reference.

SUMMARY OF THE INVENTION

In one aspect of the invention, a cathode for a laser generator is provided including a monolithic substrate consisting essentially of a nonconductive material and including a thin film of a conductive material deposited thereon. The substrate has an inner and outer surface, wherein the thin film substantially contiguously covers the substrate and prevents exposure of the substrate over the life of the cathode, and wherein the conductive thin film is oversprayed onto a portion of the substrate's outer surface so as to allow electrical contact from the outer surface to the inner surface.

Other objects, features and advantages of the present invention will become apparent to those skilled in the art through the description of the preferred embodiment, claims and drawings herein where like numerals refer to like elements.

DESCRIPTION OF THE PREFERRED EMBODIMENT

Figure 1:
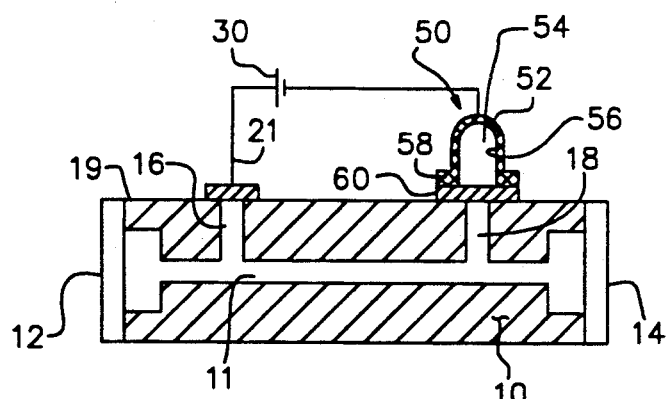
FIG. 1 is a schematic diagram of a gas laser.

FIG. 1 illustrates a cathode commonly used for a wide variety of gas lasers. The laser is generally comprised of a body 10 having a cavity 11 containing a gas or gas mixture such as helium or neon. Fixed to the laser body are mirrors 12 and 14 for establishing a laser path therebetween. In communication with cavity 11 are passageways 16 and 18, both extending between the surface 19 of body 10 and cavity 11.

Covering passageway 16 at surface 19 is a first electrode 21 utilized as an anode. Anode 21 is adapted to be electrically connected to the positive side of electric potential source 30. Anode 21 is secured to body 10 by a gas tight seal, e.g., an indium seal (not shown), in a well known manner. Anode 21 is intended to be in communication with passageway 16 to provide an electrical discharge path through the gas.

Similarly, a second electrode 50 covers passageway 18 at surface 19 and is utilized as a cathode. Cathode 50 is adapted to be electrically connected to the negative side of source 30. Cathode 50 is intended to be in communication with passageway 18 to also provide an electrical discharge path through the gas.

Figure 2:
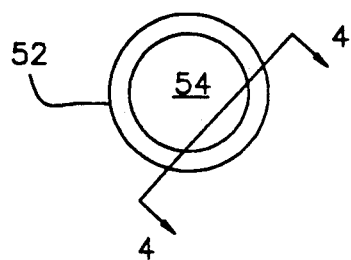
FIG. 2 is a bottom view of the cathode illustrated in FIG. 1.

As is generally illustrated in FIGS. 1 and 2, cathode 50 is comprised of a body 52 having a cavity 54 with a cathode emitting surface 56. Cathode 50 may be fixed to a laser body 10 by an indium seal 60, or by any other appropriate manner.

Figure 3:
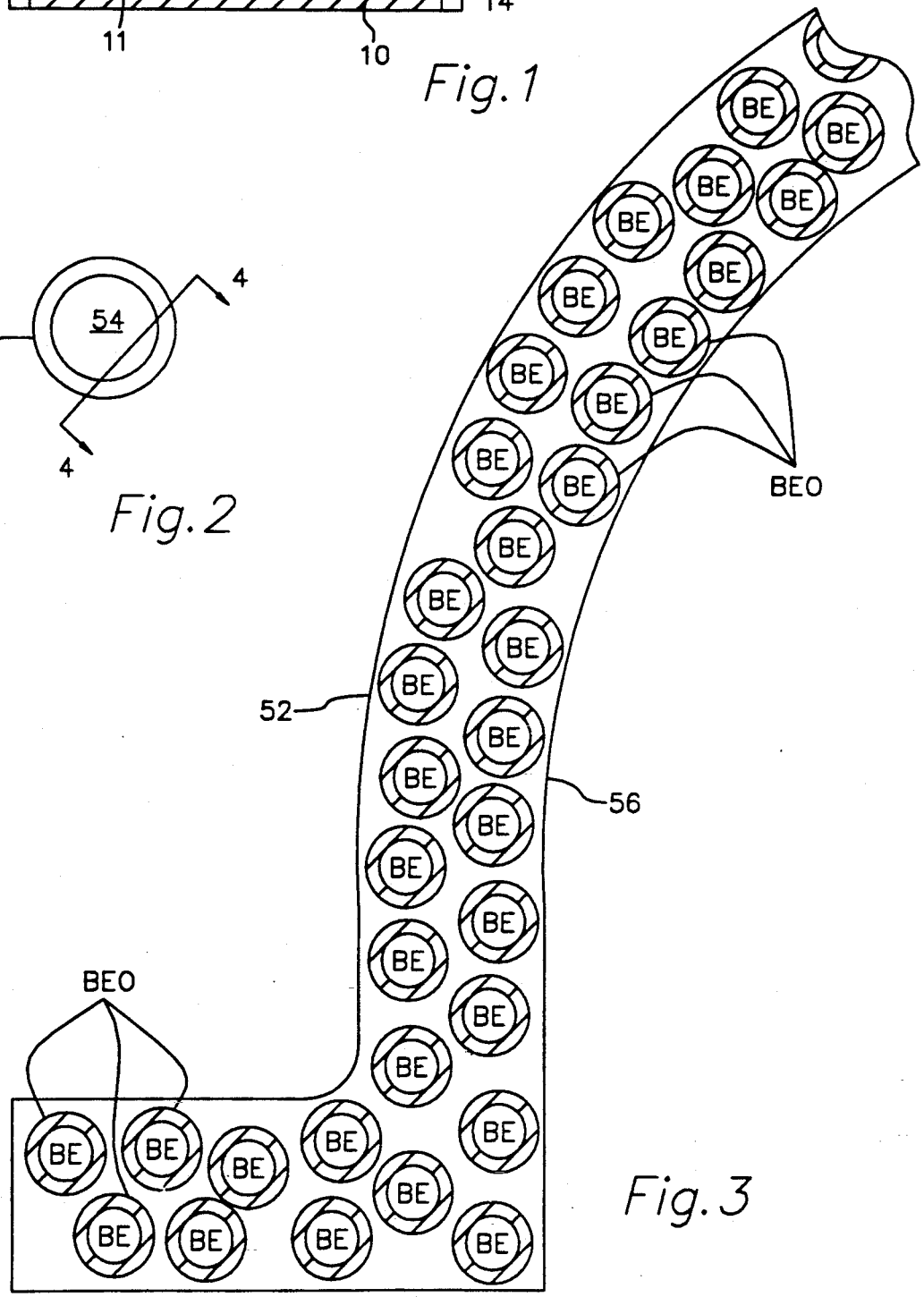
FIG. 3 is a conceptual microscopic view of the wall of the cathode in accordance with the present invention.

As is particularly illustrated in FIG. 3, in the present invention cathode 50 is constructed of a monolithic body consisting essentially of beryllium and beryllium oxide wherein the composition has a high concentration of beryllium oxide. The cathode includes a cathode emitting surface 56 having molecules of beryllium coated with BEO. The labeled inner circles represent molecules or atoms of beryllium. The BE molecules are surrounded by BEO as indicated by crosshatched outer circles around a BE molecule.

After construction of the monolithic body, the cathode is processed. The cathode is mounted to a gyro block. The gyro block is backfilled with a sputter gas or backfill gas, such as oxygen. The cathode is bombarded with a selected gas, such as oxygen, to remove carbon contamination using a sputtering and chemical process. That is, the cathode is sputtered with oxygen and some of the oxygen reacts with the carbon contamination layer to form CO and $CO_2$ molecules may then be easily removed, thus allowing easier removal of the carbon contamination.

In the preferred embodiment of the invention, a rod of Brush Wellman, Inc. beryllium identified as "I-400" was machined to produce a long life cathode. The I-400 material is composed substantially of beryllium and BEO wherein the BEO is present in concentrations of at least 4%. Tests conducted at Honeywell Inc., Minneapolis, Minn. on a cathode comprised of I-400 material, yielded a life of approximately 2 times the life of a similar cathode comprised of S-200F material from Brush Wellman, Inc. which comprises a maximum of 2% beryllium. At low gas discharge current, the predicted life of an I-400 cathode is 3-5 times the life of a similar cathode comprised of S-200F material. Increasing the percentage of BEO to beryllium results in increasing the secondary electronic emission of the cathode which, in turn, results in increasing the life of the laser discharge by decreasing sputtering from the cathode and burial of the laser gas in the cathode.

Figure 4:
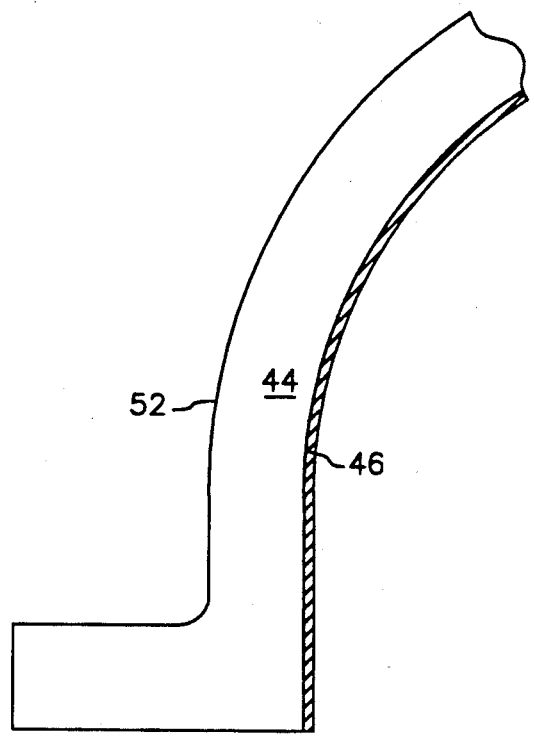
FIG. 4 is a cross section of an alternative embodiment of the cathode of FIG. 2 employing a conductive substrate.

Referring now to FIG. 4, a cross section of an alternative embodiment of cathode body 52 is shown. The cathode 52, in this example, comprises a monolithic substrate 44. The monolithic substrate may advantageously comprise a conductive or nonconductive material, for example invar, boron carbide, carbon, glass or ceramic. The substrate advantageously has a controlled coefficient of expansion which is selected for compatibility with the coefficient of expansion of the surface to which the cathode is mounted. The degree of compatibility depends upon the use of the cathode 50. A thin film of beryllium 46 is deposited upon the substrate 44. The thin film of beryllium advantageously includes a controlled amount of BeO. The film 46 is advantageously made thick enough to have no pin holes so as to contiguously cover the substrate 44. The thin film 46 therefore prevents the substrate 44 from contacting the plasma in a helium-neon gas laser, for example. The film 44 is most advantageously made thick enough to prevent exposure of the substrate due to sputtering of the film 44 over the life of the cathode. The BeO content of the film 46 may advantageously be greater than 4.0% in order to take advantage of the higher secondary electron emission of the BeO material as explained hereinabove. The beryllium layer 46 may be deposited by a variety of thin film methods which are well known in the art. These methods may include e-beam deposition, i-beam deposition, molecular beam epitaxy and other equivalent deposition processes. The beryllium film having the BeO content may advantageously be deposited using a Be target having at least 4.0% BeO content, a Be target in an oxygen atmosphere, or a Be and a BeO target sputtered together.

Figure 5:
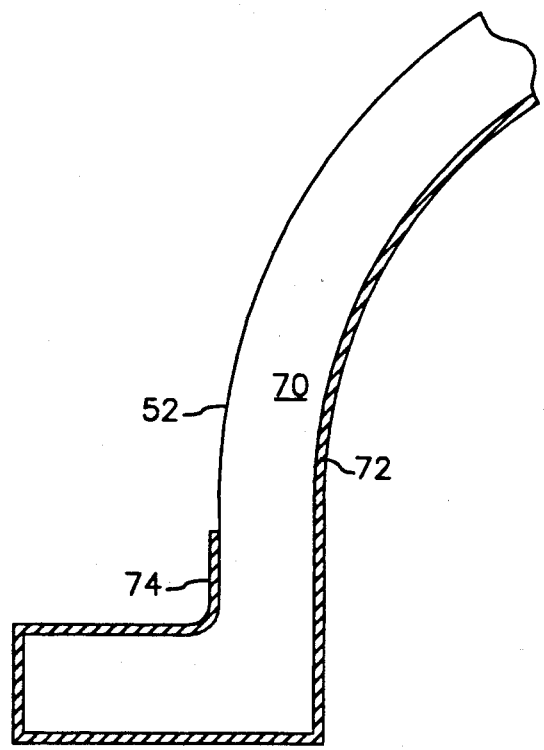
FIG. 5 is a cross section of yet another embodiment of the invention employing a nonconductive substrate.

Referring now to FIG. 5, a cross section of yet another alternative embodiment of cathode body 52 is shown. The cathode 52, in this example, comprises a monolithic substrate 70. The monolithic substrate may advantageously comprise a nonconductive material, for example, glass. The substrate advantageously has a controlled coefficient of expansion which is selected for compatibility with the coefficient of expansion of the surface to which the cathode is mounted. The degree of compatibility depends upon the use of the cathode 50. A thin film of a selected conductive material 72 is deposited upon the substrate 70.

The substrate 70 may advantageously comprise any nonconductive material suitable for receiving deposition of the conductive film 72. An overspray area 74 of the conductive film material 72 is provided through the use of well known deposition techniques. The overspray area 72 is deposited on the exterior wall of the cathode 50 so as to allow electrical connection to the conductive film 72 after the cathode 50 is mounted on, for example, a laser gyro block.

In one example of a cathode having a nonconductive substrate, a thin film of aluminum was deposited on a glass substrate using an electron beam deposition process. The glass substrate was formed using well known glass blowing techniques. Such cathodes are very inexpensive to fabricate and exhibit a very long life when compared to more expensive cathodes fabricated from solid conductive materials. Using a glass substrate with a thin deposit provides a smooth, polished surface without the need for expensive machining.

The thin film of conductive material may be comprised of aluminum or beryllium, for example. The Be film may include a controlled amount of BeO. As in the above example of FIG. 4, the film 72 is advantageously made thick enough to have no pin holes so as to contiguously cover the substrate 70. The thin film 72 therefore prevents the substrate 70 from contacting the plasma in a helium-neon gas laser, for example. The film 72 is most advantageously made thick enough to prevent exposure of the substrate due to sputtering of the film 72 over the life of the cathode. If beryllium is used, the BeO content of the film 72 may advantageously be greater than 4.0% in order to take advantage of the higher secondary electron emission of the BeO material as explained hereinabove. The conducting layer 72 may be deposited by a variety of thin film methods which are well known in the art. These methods may include e-beam deposition, i-beam deposition, molecular beam epitaxy and other equivalent deposition processes as discussed hereinabove.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A cathode for a gas discharge device comprised of a monolithic substrate having a first surface with at least a portion of said first surface in communication with an ionization gas, said substrate further having a second surface, said substrate consisting essentially of a nonconductive material, and said first surface including a thin film of a conductive material deposited thereon, wherein the thin film substantially contiguously covers the first surface and is oversprayed onto a portion of the substrate's second surface so as to provide an electrical connection between said thin film of conductive material and said oversprayed portion.

2. The cathode of claim 1 wherein the monolithic substrate comprises substantially glass.

3. The cathode of claim 1 wherein the conductive thin film comprises substantially beryllium.

4. The cathode of claim 3 wherein the beryllium thin film comprises at least 4.0% BeO.

5. The cathode of claim 1 wherein the conductive thin film comprises substantially aluminum.

6. The cathode of claim 1 wherein said substrate is generally dome shaped having an inner surface and wherein said first surface forms the inner surface of said dome shaped substrate.

7. A laser generator comprising:
(a) a body containing a gas;
(b) an electric potential source;
(c) an electrode in communication with said gas, said electrodes secured to said body with a gas tight seal, and wherein said electrode is substantially comprised of a monolithic substrate having an outer surface encompassing an inner surface with said inner surface being exposed to said gas, said substrate consisting essentially of a nonconductive material, and said inner surface including a thin film of a conductive material deposited thereon, wherein the thin film substantially contiguously covers the inner surface and is oversprayed onto a portion of the substrate's outer surface to provide an electrical connection between said oversprayed portion and said thin film.

8. The laser generator of claim 7 wherein the monolithic substrate comprises substantially glass.

9. The laser generator of claim 8 wherein the beryllium thin film comprises at least 4.0% BeO.

10. The laser generator of claim 9 wherein the conductive thin film comprises substantially aluminum.

11. The laser generator of claim 7 wherein the conductive thin film comprises substantially beryllium.

12. The laser generator of claim 7 wherein said substrate is generally dome.

* * * * *